C. E. RAHM.
AUTOMOBILE SAFETY CRANKING DEVICE.
APPLICATION FILED MAR. 13, 1915.

1,162,648.

Patented Nov. 30, 1915.
2 SHEETS—SHEET 1.

Witnesses
J. P. Britt

Inventor
Charles Ernest Rahm,
By
Attorneys

C. E. RAHM.
AUTOMOBILE SAFETY CRANKING DEVICE.
APPLICATION FILED MAR. 13, 1915.
1,162,648.
Patented Nov. 30, 1915.
2 SHEETS—SHEET 2.
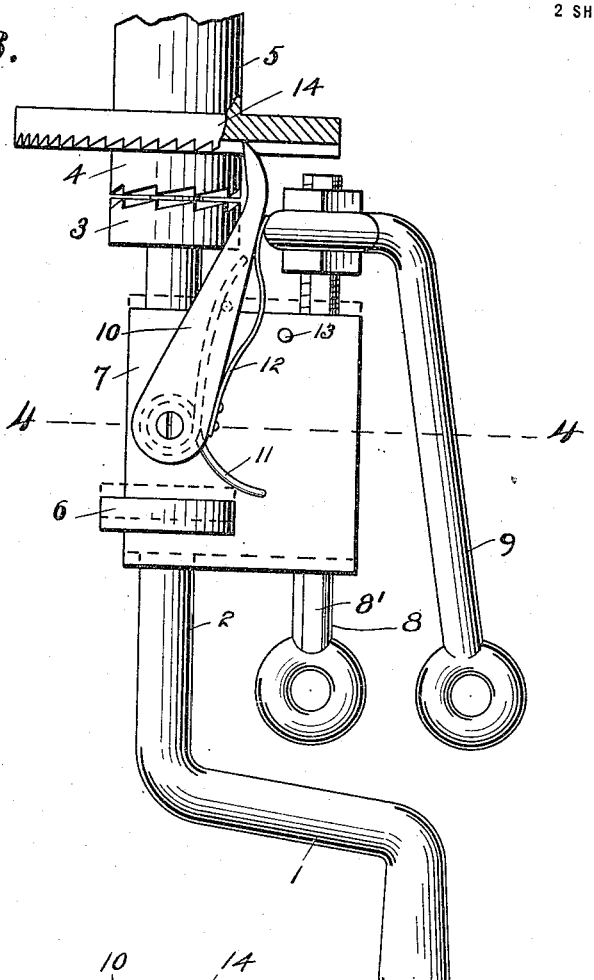
Fig. 3.
Fig. 4.
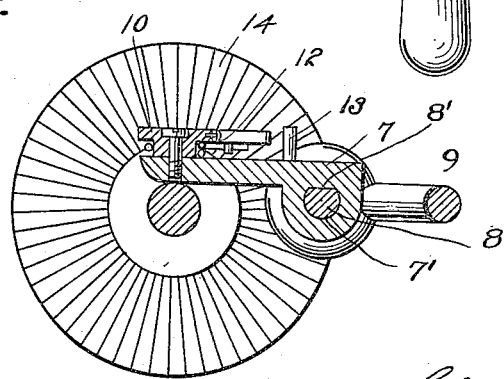

UNITED STATES PATENT OFFICE.

CHARLES ERNEST RAHM, OF MORGANFIELD, KENTUCKY.

AUTOMOBILE SAFETY CRANKING DEVICE.

1,162,648.  Specification of Letters Patent.  Patented Nov. 30, 1915.

Application filed March 13, 1915. Serial No. 14,162.

*To all whom it may concern:*

Be it known that I, CHARLES ERNEST RAHM, a citizen of the United States, residing at Morganfield, in the county of Union and State of Kentucky, have invented certain new and useful Improvements in Automobile Safety Cranking Devices; and I do declare the following to be a full clear, and exact description of the invention, such as will enable others skilled in the art to which it appertains to make and use the same, reference being had to the accompanying drawings, and to the letters and figures of reference marked thereon, which form a part of this specification.

This invention relates to automobile cranking devices and has for its object to provide a safety cranking device for the purpose of preventing injury to the operator when cranking an automobile motor by hand, and which is so constructed and arranged that it can be quickly and inexpensively applied to existing automobiles without requiring the installation of a new starting crank or the existing clutch members.

Very frequent and serious injury is occasioned by cranking an automobile motor due to the fact that the ignition is inadvertently advanced to such a point that the motor fires before one of its pistons reaches the limit of its compression stroke, thus driving the piston down in the opposite direction to that of its normal movement, and causes the starting crank to be rotated in the opposite direction of that of its normal rotation, which causes a sudden wrench on the hand and arm of the operator which invariably results in injuries usually in the form of a lacerated hand or broken arm. It is for the purpose of obviating this difficulty and rendering the cranking of a motor entirely safe I have made this invention, which consists in the arrangement and combination of parts for disengaging the clutch of the starting crank from the motor crank shaft automatically whenever the motor fires prematurely during the cranking operation.

Figure 1:
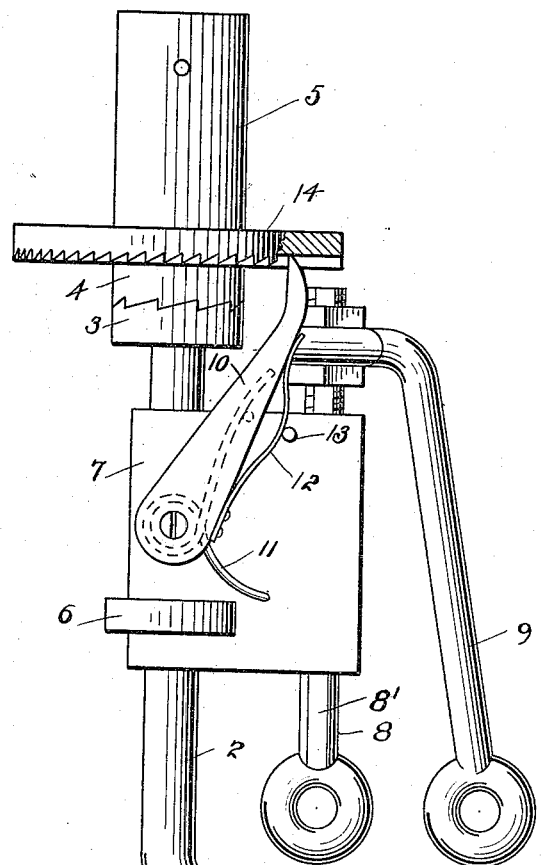
Figure 2:
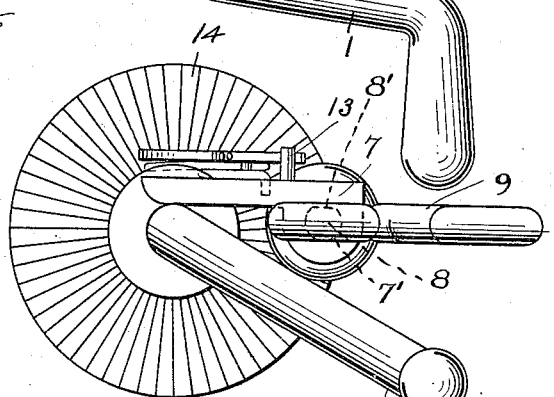

Referring to the accompanying drawings—Figure 1 is a plan view of a starting crank and clutch to which my invention has been applied. Fig. 2 is a front elevation of the same. Fig. 3 is a plan view illustrating the device in position of disengaging the clutch, and Fig. 4 is a vertical transverse sectional view taken on line 4—4 of Fig. 3.

Like numerals of reference indicate the same parts throughout the several figures, in which—1 indicates the usual starting crank of an automobile formed on the shaft 2 which is provided at its inner end with the clutch member 3, which engages the clutch member 4 in the manner as shown in Fig. 1, so that the crank shaft 5 of the motor can be turned upon rotation of the starting crank, it being understood that the shaft 2 of the starting crank 1 is slidable longitudinally so that the clutch members 3 and 4 can be engaged at will and disengaged upon rotation of the motor in its proper normal direction.

Arranged on the shaft 2 of the crank 1 is a collar 6 fastened thereon and slidable therewith, said collar entering a plate 7 so that said plate is slidable with said shaft 2, but not rotatable therewith, the plate 7 being mounted on the bracket arm 8 which is conveniently secured to the machine, and which is provided with a flattened surface 8' to be received in the longitudinal opening 7' which is distorted as shown in Fig. 4 so as to prevent rotation of the plate 7 in the bracket arm 8, while a bracket arm 9 is provided for bracing the device and holding the same in proper operative position.

Mounted on the plate 7 is a pawl 10 actuated by a leaf spring 11 to hold the same in its normal position as shown in Fig. 1. The said pawl being also provided with a leaf spring 12 normally engaging with the stop 13 to allow and provide for a slight oscillating movement of the pawl 10 when the same is in engagement with the rotating ratchet 14 secured on and rotating with the crank shaft 5.

Having thus described the several parts of this invention its operation is as follows: The clutch members 3 and 4 are engaged in the manner as shown in Fig. 1, by sliding the starting crank shaft 2 toward the motor, which operation carries the pawl 10 into engagement with the ratchet 14 in the manner as shown in Fig. 1, and the starting crank is turned to rotate the crank shaft 5. Should ignition occur too early in the motor to drive one of the pistons down to rotate the crank shaft and starting crank in its reverse direction the ratchet 14 is rotated with the crank shaft 5 and said ratchet being engaged by the pawl 10 the said pawl is instantly carried into position shown in Fig. 3, which forces the slidable plate 7 from position shown in dotted lines in Fig. 3 to the position shown in full lines in Fig. 3, thus carrying with it the starting crank and clutch member 3 in such manner that an instantaneous disengagement of the clutch members is effected, in the manner as clearly shown in the accompanying drawings and relieving the starting crank from further rotation by the crank shaft 5.

Having thus fully described the invention it is apparent that an automobile motor can be cranked by means of the herein described device with absolute safety to the operator, and while I have shown and described the preferred embodiment of this invention it will be of course apparent to those skilled in the art that certain changes and alterations can be made therein, and I consider myself clearly entitled to all such changes and modifications as fall within the limit and scope of the appended claims.

What I claim as new and desire to secure by Letters Patent of the United States is—

1. A safety cranking device for automobiles, including a starting crank longitudinally movable with relation to the motor, a clutch member at the inner end of said crank, a clutch member of the crank shaft of the motor, a ratchet wheel on the crank shaft of the motor and revoluble therewith, a bracket arm on the automobile lying parallel with the starting crank, a plate longitudinally slidable on said bracket arm but not rotatable thereon, a collar applied on said starting crank to cause said plate to slide therewith, a pawl mounted on said plate and having its pivot at right angles to the axis of rotation of the starting crank and in line with said axis, means for normally holding said pawl out of line with the axis of rotation of said crank, the effective end of said pawl being adapted to engage the toothed face of said ratchet wheel upon engagement of the said two clutch members to allow free rotation of said ratchet wheel in one direction, the said ratchet wheel being adapted to move said pawl on its pivot toward the line of the axis of rotation of the said crank to lengthen the distance between the face of the said ratchet wheel and the pivotal point of the said pawl to move the said plate and crank away from the crank shaft of the motor to disengage the said clutch members.

2. A safety cranking device for automobiles, including a starting crank longitudinally movable with relation to the motor, a clutch member at the inner end of said crank, a clutch member of the crank shaft of the motor, a ratchet wheel on the crank shaft of the motor and revoluble therewith, a bracket arm on the automobile lying parallel with the starting crank, a plate longitudinally slidable on said bracket arm but not rotatable thereon, means on said starting crank and in engagement with said plate to cause said plate to slide therewith, a pawl mounted on said plate and having its pivot at right angles to the axis of rotation of the starting crank and in line with said axis, means for normally holding said pawl out of line with the axis of rotation of said crank, the effective end of said pawl being adapted to engage the toothed face of said ratchet wheel upon engagement of the said two clutch members to allow free rotation of said ratchet wheel in one direction, the said ratchet wheel being adapted to move said pawl on its pivot toward the line of the axis of rotation of the said crank to lengthen the distance between the face of the said ratchet wheel and the pivotal point of the said pawl to move the said plate and crank away from the crank shaft of the motor to disengage the said clutch members.

In testimony whereof, I affix my signature, in presence of two witnesses.

CHARLES ERNEST RAHM.

Witnesses:
GEORGE HENRY DRURY,
W. T. DRURY.